United States Patent [19]
Altus

[11] Patent Number: 4,921,742
[45] Date of Patent: May 1, 1990

[54] FLOOR MAT RETENTION SYSTEM FOR AUTOMOTIVE VEHICLES

[75] Inventor: Mark Altus, Huntington Woods, Mich.

[73] Assignee: The 2500 Corporation, Farmington Hills, Mich.

[21] Appl. No.: 199,600

[22] Filed: May 27, 1988

[51] Int. Cl.$^5$ .............................. B32B 3/06; B60J 9/00
[52] U.S. Cl. ........................................ 428/81; 428/82; 428/85; 428/86; 428/95; 428/99; 428/101; 428/223
[58] Field of Search ..................... 428/81, 82, 85, 86, 428/95, 99, 101, 223; 74/564

[56] References Cited

U.S. PATENT DOCUMENTS

| | | | |
|---|---|---|---|
| 2,136,980 | 11/1938 | Pim | 74/564 |
| 3,114,272 | 12/1963 | Sawyer | 74/564 |
| 4,716,065 | 12/1987 | McLaughlin | 428/95 |
| 4,748,063 | 5/1988 | Reuben | 428/95 |
| 4,758,457 | 7/1988 | Altus | 428/85 |

*Primary Examiner*—Marion C. McCamish
*Attorney, Agent, or Firm*—Dykema Gossett

[57] ABSTRACT

There is disclosed a floor mat retention system for automotive vehicles which provides for positive attachment of the floor mat to the vehicle body without penetrating the automotive carpet. A first retainer portion is fixedly mounted to the automotive vehicle by a method other than penetrating the automotive carpeting and a second retainer portion is removably attached to said first retainer portion. A floor mat construction is then removably attached to at least said second retainer portion. The first and second retainer portions may have bristles on one or both sides thereof to aid in preventing slippage, and the floor mat construction may have carpet nap on both sides thereof so that it may be made reversible, if desired.

39 Claims, 3 Drawing Sheets

U.S. Patent May 1, 1990 Sheet 1 of 3 4,921,742
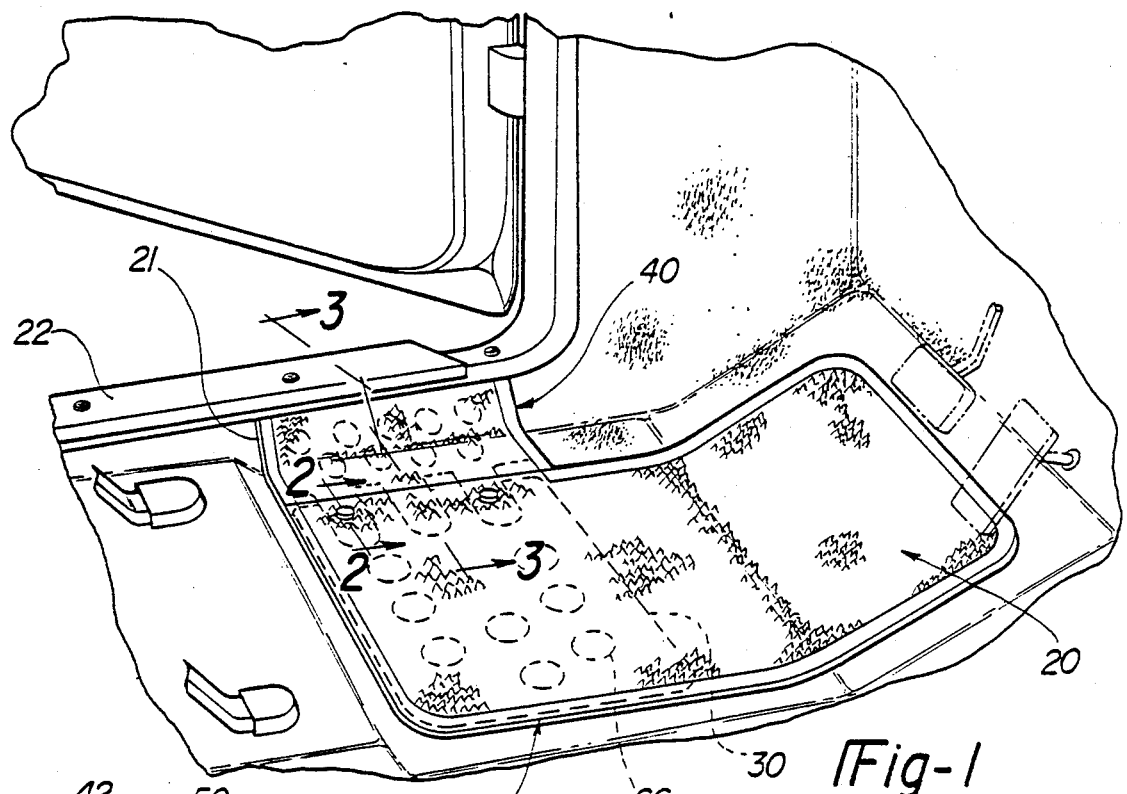
Fig-1
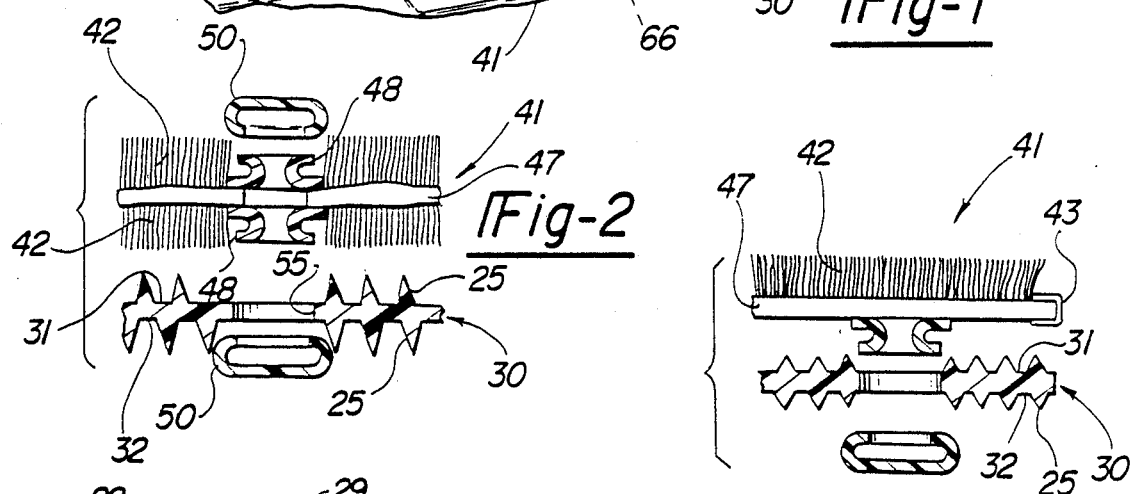
Fig-2
Fig-2A
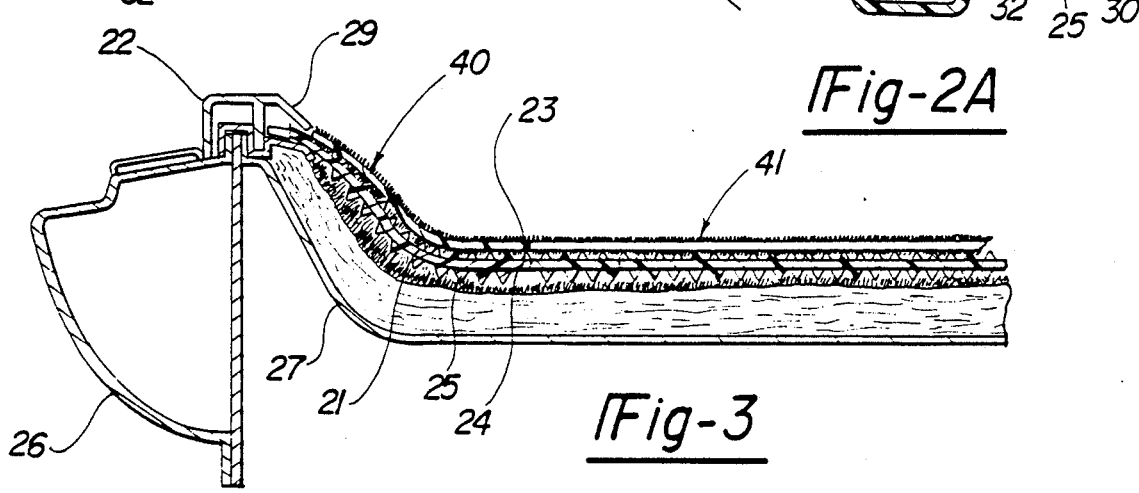
Fig-3

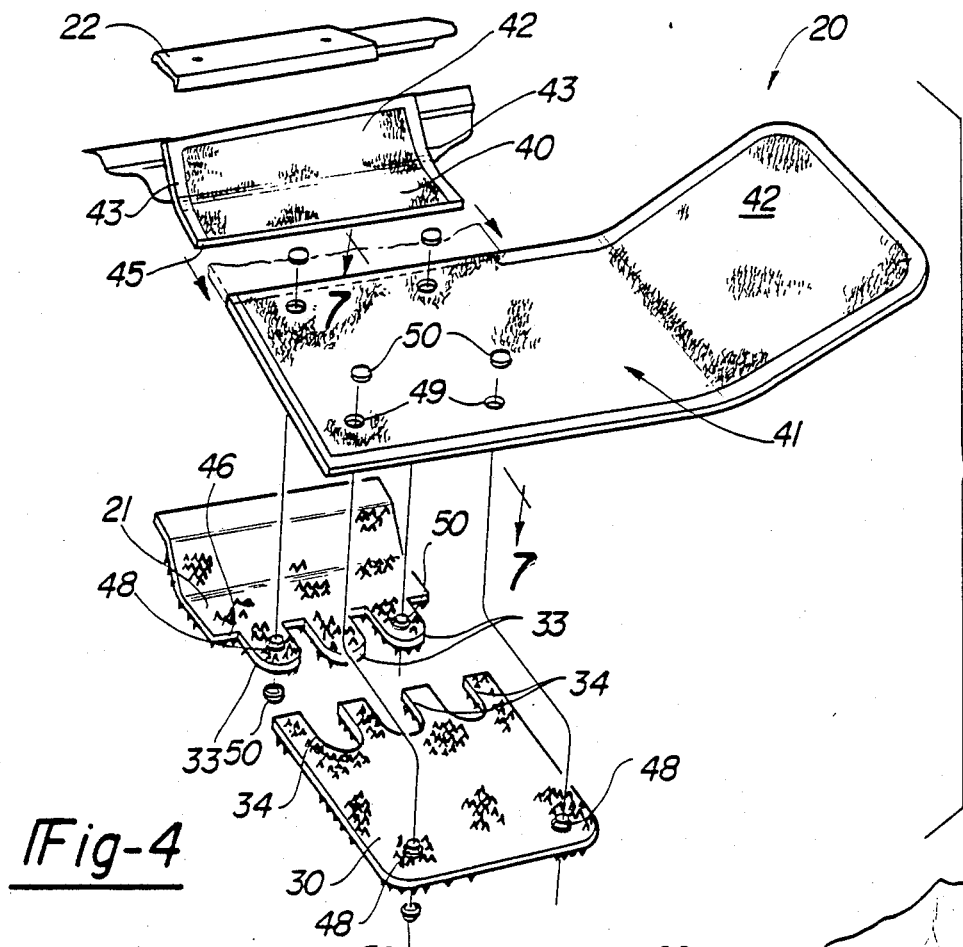
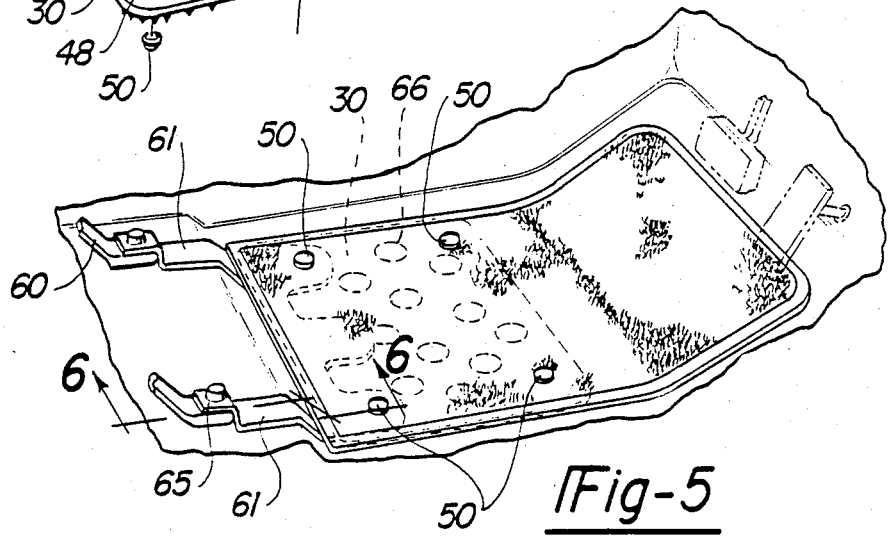
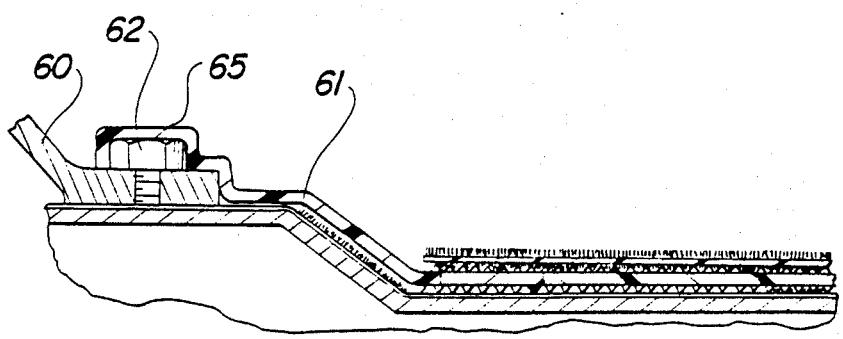

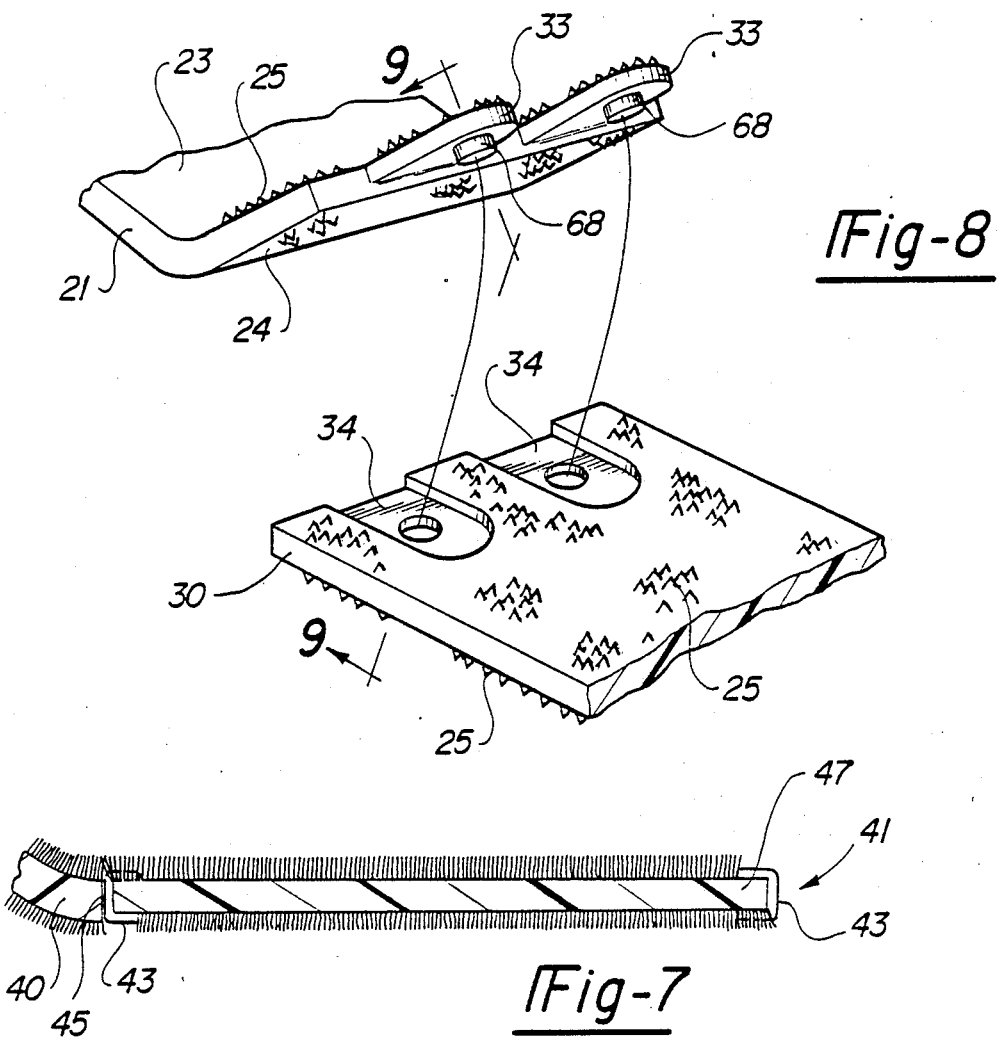
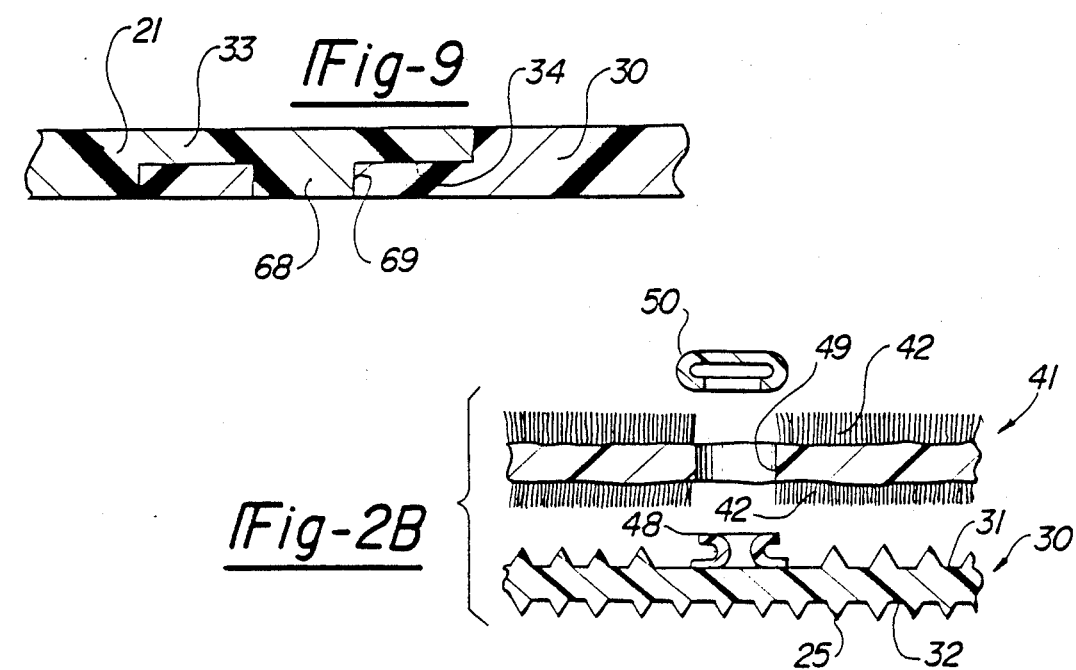

FLOOR MAT RETENTION SYSTEM FOR AUTOMOTIVE VEHICLES

BACKGROUND OF INVENTION

1. Field of the Invention

The present invention relates to automotive floor mats, and more particularly to a method and apparatus for postively locating floor mats in automotive vehicles by having at least one portion of the floor mat retainer system mounted to the automotive vehicle. The need for retainers in connection with automotive floor mats is fully discussed in U.S. Pat. Nos. 4,361,610; 4,481,240, 4,588,628 and 4,673,603 owned by the assignee of the present invention. However, even though these patents discuss the need for the retention of automotive floor mats with regard to automotive carpets, they do not deal with the positive retention of floor mats in automotive vehicles by having a portion of a floor mat mounting system attached to the automobile body, which is the subject of the present invention.

2. Description of the Prior Art

It has long been the practice to cover areas of automotive carpeting which are subjected to heavy wear with separate floor mats, which usually have at least one surface covered with a carpet material, although they may be of an all rubber construction. For as long as this has been done, there has been a severe problem with these mats unexpectedly moving, and sometimes causing interference with the proper operation of the brake and/or accelerator pedals in automobiles. Recently there have been recalls involving thousands of automobiles to have their floor mats replaced because they have slipped and jammed under the accelerator pedal, and in some cases have caused accidents. While the floor mats disclosed in the above-mentioned patents of the common assignee of the present application, and in a recent application owned by said common assignee entitled "Floor Mat and Method of Attaching Retainer Thereto", filed on Oct. 15, 1987, under Ser. No. 07/109,291, have been found to be entirely satisfactory for a large majority of automotive applications, it has also been found that some floor pan designs, whether dictated by styling, function, or otherwise, still present problems which are not entirely solved by the aforementioned floor mats. This has caused the inventors in the present application to continue their work in the automotive floor mat area, and has led to the present invention which provides positive retention of the floor mat in the automotive vehicle by having at least part of the system positively mounted to the vehicle itself. Substantial and long-standing problems in the art had to be solved to determine how to provide this positive retention and still provide for the periodic removal and cleaning of the automotive floor mat.

Applicants are aware of many previous attempts to provide positive retention of automotive floor mats. One of these is to sew the floor mat to the automotive carpet. However, this makes it completely unremovable, which is undesirable, and because of the twisting motions placed on the floor mats when the occupants enter and leave the a vehicle, the floor mats tended to be torn where they were sewn to the carpet.

Another attempt simply was to try and attach the floor mats to the automotive floor pan. However, as is well known in the automotive art, automotive carpeting is backed by a water proof bonding layer to prevent moisture, such as accumulated on the carpeting when occupants enter when it has been raining or snowing, from penetrating the carpeting and contacting the automotive floor pan, which causes severe rusting problems. Whether one attempted, for example, to screw the floor mat down through the automotive carpeting to the floor pan, or place a fastening means on the floor pan and provide an opening in the carpet for the fastening means to pass through, both of these destroyed the water imperviousness of the automotive carpeting, and presented severe rusting problem s. Thus, Applicants knew a novel solution to this problem was needed.

SUMMARY OF THE INVENTION

In order to provide a floor mat retention system which does not pose any of the problems of earlier floor mat retention systems, we have provided a floor mat retention·system for automotive vehicles having a first retainer portion fixedly attached to the vehicle other than through the automotive carpeting and floor pan, and we have further provided a second retainer portion adjacent to, and removably attached to said first retainer portion. Attached to said second retainter portion, also in a removable manner is a floor mat construction. The floor mat construction may have carpet nap on one or both sides thereof, and one or both of the retainer portions may have bristles on one or both sides thereof.

Thus, it is an object of the present invention to provide a method and apparatus for positively locating floor mats in automotive vehicles.

It is a further object of the present invention to provide a positive floor mat retention system for automotive vehicles which does not destroy the water imperviousness of the automotive carpeting.

It is further object of the present invention to provide that the automotive floor mat, with or without the second retainer portion, is easily removed and replaced in the automotive vehicle.

Still another object of the present invention is to provide a positive floor mat retention system for automotive vehicles which can be used regardless of the shape of the automotive floor pan.

Still another object of the present invention is to provide a floor mat construction which is securely attached to the automotive vehicle.

A further object of the present invention is to provide a positive floor mat retention system wherein a floor mat construction is removably attached thereto by appropriate fastening means.

Further objects and advantage of the present invention will be apparent from the following description and appended claims, reference being had to the accompanying drawings forming a part of the specification, wherein like reference characters designate corresponding parts in the several views.

BRIEF DESCRIPTION OF THE DRAWINGS

FIG. 1 is a partial perspective view showing one embodiment of our invention mounted in an automotive vehicle.

FIG. 2 is a sectional view, taken in the direction of the arrows, along the section line 2—2 of FIG. 1.

FIG. 2A is a view similar in large part to FIG. 2 but showing a floor mat construction having carpeting only on side thereof.

FIG. 2B is a view similar in large part to FIG. 2 but showing the male fastening means mounted to the retainer instead of the floor mat construction.

FIG. 3 is a sectional view, taken in the direction of the arrows, along the section line 3—3 of FIG. 1.

FIG. 4 is an exploded perspective view showing the relationship of the parts of the construction shown in FIG. 1.

FIG. 5 is a partial perspective view showing a modification of our invention mounted in an automotive vehicle.

FIG. 6 is a sectional view, taken in the direction of the arrows, along the section line 6—6 of FIG. 5.

FIG. 7 is a sectional view, taken in the direction of the arrows, along the section line 7—7 of FIG. 4.

FIG. 8 is an exploded partial perspective view showing an alternate method of providing for the removable attachment of the second retainer portion to the first retainer portion.

FIG. 9 is a partial sectional view, taken in the direction of the arrows, along the section line 9—9 of FIG. 8.

It is to be understood that the present invention is not limited in its application to the details of the construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENT

Referring to FIGS. 1-4, there is shown a positive floor mat retention system generally designated by the numeral 20, and including a first retainer portion 21 which is held in place under the sill plate 22 of the automotive vehicle. The first retainer portion 21 will have an upper surface 23 and a lower surface 24, either or both of which may be covered wholly or partially by bristles 25 for the purposes described in said co-pending patent application Ser. No. 07/109,291.

A second retainer portion 30 may either be attached to the first retainer portion 21 as shown in FIG. 8, or the second portion 30 may be placed contiguously with the first retainer portion 21 as shown in FIGS. 1, 3, 4 and elsewhere. In the embodiment shown in FIGS. 1 and 4, a plurality of extentions 33 are provided on the first retainer portion 21, and a like number of complimentary recesses 34 are provided in second retainer portion 30 so that second retainer portion 30 will fit contiguously with the first retainer portion 21 like pieces of a "jigsaw" puzzle.

The second retainer portion 30 may be of a greater width than the first retainer portion 21 or they may be of the same width. When placed together, the first retainer portion 21 and the second retainer portion 30 make a "continuous" surface for the mounting of the first carpet piece 40 and the floor mat construction 41. The sill plate 22 is provided to cover the joint between the rocker panel 26 and the floor pan 27. The first carpet portion 40 may or may not be retained under the lip 29 of the sill plate 22, although it is preferred that the first retainer portion 21 be so retained, as in this embodiment of the invention this is how the positive retention of our floor mat mounting system is accomplished.

The first carpet piece 40 may have carpet nap on one or both sides thereof, and in the preferred embodiment, is aided in its retention on the first retainer portion 21 by bristles 25, although the bristles 25 are only recommended if the first carpet piece 40 is not retained under the lip 29. The first carpet piece is substantially coextensive with the first retainer portion 21. The first carpet piece 40 terminates proximate the base line 46 of the extensions 33. Edge binding 43 may be placed about the other 3 edges of the first carpet piece 40, but is not found on the longitudinal edge 45. Carpet nap 42 may be provided on one or both sides.

The floor mat construction 41 may be similar to that described in co-pending patent application Ser. No. 07/109,291, and may have carpet nap 42 on one or both sides of a suitable carpet base 47. The manufacture of the actual carpet material by this time is well known in the art, and need not be described in detail herein. Edge binding 43 will be applied around the entire periphery on the floor mat construction 41 except where it is to meet the longitudinal edge 45 of the first carpet piece, which will be described in more detail hereinafter. One or both of the first retainer portion 21, and the second retainer portion 30, preferably will have fastening means in the form of male fasteners 48 mounted thereto, which, when passed through complimentary placed openings 49 in the floor mat construction 41, will allow said floor mat construction to be held firmly in place by virtue of the female fasteners 50 being attached to the male fasteners 48.

Referring now to FIGS. 2, 2A, and 2B, various modifications of my invention are shown. In FIG. 2 there is shown a floor mat construction 41 having carpet nap 42 on both sides of a suitable carpet base 47, and 2-sided second retainer portion 30 having bristles 25 on both surfaces. A plurality of openings 55 are provided in the retainer to allow the male fasteners 48 to be passed therethrough, and to engage the female fasteners 50, thereby securely holding the floor mat construction 41 to the second retainer 30. Since in this embodiment, the floor mat construction 41 is reversible, a male fastener 48 has to be provided on both sides thereof, and the unused male fastener is capped by an additional female fastener 50. It can be seen that when it is desired to reverse the floor mat construction 41, the female fasteners 50 are unfastened from the male fasteners 48, the floor mat construction 41 is reversed, and the female fasteners 50 are reattached. If desired, the female fastener placed on the top side of the floor mat construction 41 may be used for decorative purposes, such as having a logo embossed thereon.

The modification shown in FIG. 2A shows a one-sided floor mat construction 41 having carpet nap 42 on the top of a suitable carpet base 47 and having edge binding 43 sewn thereon except where it is to meet the longitudinal edge 45 of the first carpet piece 40, in which case the edge binding will be cut away as shown in FIG. 4. When a one sided carpet construction 41 is used, one may eliminate the bristles 25 on the top side of the second retainer portion 30, if desired.

Referring to FIG. 2B, it can easily be seen that the male fasteners can be placed on the retainer 30, rather than on the floor mat construction 41. In this case, the complimentary openings 49 mentioned in connection with the description of FIGS. 1 and 4 allow the male fasteners 48 to pass through the floor mat construction 41 and have a female fastener 50 attached. Since the second retainer portion 30 is made of a plastic material and is durable, it usually does not need to be reversible, so we have shown only one male fastener 48 provided on said retainer portion 30. However, it is well within the scope of the present invention to have male fasteners on the top and the bottom of the retainer 30. If desired, reinforcements (not shown) can be placed around the complementary openings 49 to give extra strength to the floor mat construction 41. Also, it should be understood that the position of the male and female fasteners can be reversed, in that the female fasteners could be placed on the retainer, and the male fasteners mounted on the carpet construction 41, or referring back to FIGS. 2 and 2A, the female fasteners could be placed on the carpet construction 41, and the male fasteners could then be inserted into the female fasteners to hold the floor mat construction 41 to the retainer portions 21, 30.

Referring now to FIG. 7, it can be seen how a portion of the edge binding 43 is cut away wherever the floor mat construction 41 meets the first carpet piece 40. Since there is no edge binding on the longitudinal edge 45 of the first carpet piece 40, and as shown in dotted lines, there is no edge binding on the top side of the floor mat construction 41, where it is to meet said longitudinal edge, the carpet nap 42 from the first carpet piece 40 will intermingle with the carpet nap from the floor mat construction 41, giving the appearance of a continuous piece of carpet. As can be seen, the edge binding is cut away in a mirror image on the lower edge of the floor mat 41 so that when it is reversed, the same occurrence will take place, giving the appearance of a continuous floor mat going from the toe pan of the automobile, to the floor pan, and up to the door sill. The combination of positively retaining the first retainer portion under the sill plate 22, combined with the holding power of the bristles 25 as described in the aforementioned patents and patent application, and proved by a large measure of commercial success, provide an extremely stable floor mat and solve long standing problems in the art.

Referring to FIG. 5, it is anticipated that there may be some applications in which the first retainer portion 40 may not be able to be captured between the sill plate 22, the rocker panel 26, and floor pan 27, and in this case, it is preferred to mount the first retainer portion 21 to the seat belt anchors 60 by means of the strap 61, as shown in more detail in FIG. 6. While at first glance it would seem logical to mount the strap 61 in place when the bolt 62, are used to fasten the seat belt anchors 60 in position, it is the understanding of Applicants that federal regulations prevent such attachment. Therefore, we have shown a modified end portion 65 of the strap 61 adapted to be press fit over the combination of the bolt 62 and the seat belt anchor 60. Aside from having the strap 61 with the modified end portion in 65, the remainder of the first retainer portion is substantially the same as, and operates in substantially the same manner as, the first retainer portion 21, described in connection with FIGS. 1-4, although the first carpet piece 40 usually does not extend on to the strap portion 61 of the first retainer 21.

Whether the modification of my invention shown in FIGS. 1-4 is used, or the modification shown in FIGS. 5 and 6 is used, mass reduction openings 66 may be placed in the second retainer portion 30 to save weight. If desired, these openings may also be placed in the first retainer portion.

Now referring to FIGS. 8 and 9, a modification of my invention is shown whereby the extensions 33 on the first retainer portion 21, and the recesses 34 on the second retainer portion 30, are only approximately half the thickness of the retainer, the first retainer portion 21 and the second retainer portion 30 preferably being of equal thickness to present a uniform thickness for the mounting of the first carpet piece 40 and the floor mat construction 41.

Whereas in the modification of my invention described in FIG. 4 there is no direct connection between the first retainer portion 21 and the second retainer portion 30, in this modification of our invention, the posts 68 on the extensions 33 of the first retainer portion 21 fit in complimentary post holes 69 provided in the recesses 34 on the second retainer 30 to provide a positive interlocking contact between the first retainer portion 21 and the second retainer portion 30. This modification of my invention is preferably used where large areas of automotive vehicle floor must be covered to provide additional strength to the construction.

Whichever modification of our invention is used, the bristles 25 may be on one or both sides of the first retainer portion 21 or the second retainer portion 30, and may cover all or only a portion of the retainer. The density of the bristles, where bristles are provided, will depend on the type of carpeting being used. Preferably, the density of the bristles forming the lower surface of either retainer is from 50% to 100% of the density of the carpet cover material, although the exact density will vary depending on the particular carpet material.

Likewise, the length of the bristles, their composition, and exact shape will depend on the particular application to which our positive floor mat retention system is to be put, which in turn, is at least partly dependent on the shape of the automobile floor pan, and on the type and density of the carpet material covering said floor pan. A particularly useful length of bristle has been found to be no more than ¾ of the average length of the carpet cover material on which said retainer is to be placed.

The aforementioned mass reduction openings 66 may be of various sizes and shapes, depending upon the particular application to which the retainer is to be placed.

Thus, after carefully analyzing the previous attempts at providing positively retained automotive floor mats, we have developed a novel positive floor mat retention system for an automotive vehicle.

I claim:
1. A positive floor mat retention system for automotive vehicles including:
   (a) a first retainer portion fixedly attached to said automotive vehicle;
   (b) a first piece of carpet covering said first retainer portion;
   (c) a second retainer portion removably attached to said first retainer portion; and
   (d) a floor mat construction removably attached to said second retainer portion.
2. The device defined in claim 1, wherein:
   (a) said floor mat construction is removably attached to said second retainer portion by appropriate fastening means.
3. The device defined in claim 2, wherein said appropriate fastening means include male and female fasteners.
4. The device defined in claim 2, wherein said floor mat construction includes:
   (a) a carpet base having nap on one side thereof; and
   (b) an edge binding around the perimeter thereof.

5. The device defined in claim 4, wherein:
(a) said edge binding is absent from the nap side of said carpet base where said floor mat construction meets said first piece of carpet.

6. The device defined in claim 5, wherein said first retainer portion includes a lower bristled surface.

7. The device defined in claim 6, wherein said second retainer portion includes lower bristled surface.

8. The device defined in claim 7, wherein said second retainer portion also includes an upper bristled surface.

9. The device defined in claim 8, wherein said second retainer portion has mass reduction openings therein.

10. The device defined in claim 9, wherein said second retainer portion is removably attached to said first retainer portion by an interlocking fastening means.

11. The device defined in claim 10, wherein said interlocking fastening means include:
(a) a plurality of projections proximate one edge of said first retainer portion; and
(b) an equal plurality of complimentary recesses in said second retainer portion to accept and securely locate said projections, thereby removably attaching said second retainer portion to said first retainer portion.

12. The device defined in claim 11, wherein at least a portion of said appropriate fastening means are located on said projections.

13. The device defined in claim 12, wherein said appropriate fastenings means include male and female fasteners.

14. The device defined in claim 13, wherein said male fasteners are located on said second retainer portion.

15. The device defined in claim 14, wherein said female fasteners are located on said first retainer portion.

16. The device defined in claim 11, wherein the bristles forming said lower bristled surface of said second retainer portion are formed in such a manner as to provide a taper to at least a portion of said lower bristled surface.

17. The device defined in claim 11, wherein the length of the bristles forming said lower bristled surface of said second retainer portion is no more than three-fourths of the average length of the carpet cover material on which the retainer is placed.

18. The device defined in claim 17, wherein the density of the bristles forming said lower bristled surface of said second retainer portion is from 50% to 100% of the density of the carpet cover material where bristles are provided on said second retainer portion.

19. The device defined in claim 11, wherein said extensions are approximately one-half the thickness of said first retainer portion, and said recesses are approximately one-half the thickness of said second retainer portion.

20. The device defined in claim 7, wherein said first retainer portion has mass reduction openings therein.

21. The device defined in claim 2, wherein said floor mat construction includes:
(a) a carpet base having nap on both sides thereof; and
(b) an edge binding around the perimeter thereof.

22. The device defined in claim 21, wherein:
(a) said edge binding is absent from the nap side of said carpet base at both locations where the nap of said carpet base can meet said first piece of carpet.

23. The device defined in claim 22, wherein said first retainer portion includes a lower bristled surface.

24. The device defined in claim 23, wherein said second retainer portion includes a lower bristled surface.

25. The device defined in claim 24, wherein said second retainer portion also includes an upper bristled surface.

26. The device defined in claim 25, wherein said first retainer portion includes mass reduction openings therein.

27. The device defined in claim 25, wherein said second retainer portion includes mass reduction openings therein.

28. The device defined in claim 27, wherein said second retainer portion is removably attached to said first retainer portion by an interlocking fastening fastening means.

29. The device defined in claim 28, wherein said interlocking fastening means include:
(a) a plurality of projections proximate one edge of said first retainer portion; and
(b) an equal plurality of complementary recesses in said second retainer portion to accept and securely locate said projections, thereby removably attaching said second retainer portion to said first retainer portion.

30. The device defined in claim 29, wherein at least a portion of said appropriate fastening means are located on said projections.

31. The device defined in claim 29, wherein the bristles forming said lower bristled surface of said second retainer portion are formed in such a manner so as to provide a taper to at least a portion of said lower bristled surface.

32. The device defined in claim 29, wherein the length of the bristles forming said lower bristled surface of said second retainer portion is no more than three-fourths of the average length of the carpet cover material on which the retainer is placed.

33. The device defined in claim 32, wherein the density of the bristles forming said lower bristled surface of said second retainer portion is from 50% to 100% of the density of the carpet cover material where bristles are provided on said second retainer portion.

34. The device defined in defined in claim 33, wherein said extension are approximately one-half the thickness of said first retainer portion, and said recesses are approximately one-half the thickness of said second retainer portion.

35. The device defined in claim 34 and including:
(a) a post provided on each of said extensions; and
(b) a post hole provided in each of said recesses to accept said post, thereby securely attaching said first retainer portion to said second retainer portion.

36. The device defined in claim 34, wherein the relationship between said posts and said post holes is a press fit relationship.

37. The device defined in claim 36, wherein said appropriate fastening means include male and female fasteners.

38. The device defined in claim 37, wherein said male fasteners are located on said second retainer portion.

39. The device defined in claim 38, wherein said female fasteners are located on said floor mat construction.

* * * * *